Nov. 15, 1932.  R. N. STEELE  1,887,964

WRIST PIN

Filed June 25, 1930

R. N. STEELE Inventor

By Merrill M. Blackburn.
Attorney

Patented Nov. 15, 1932

1,887,964

UNITED STATES PATENT OFFICE

RAY N. STEELE, OF CEDAR RAPIDS, IOWA

WRIST PIN

Application filed June 25, 1930. Serial No. 463,650.

The present invention relates to improvements in wrist pins for connecting rods, more especially such as are used in the motors of internal combustion engines. Among the objects of this invention are to reduce the weight of such wrist pins and consequently the weight of the piston and its associated reciprocating parts; to provide a lightweight wrist pin which will have a maximum amount of strength for a given weight of finished article; to provide an improved form of wrist pin supporting post and cooperating pin; and such further objects, advantages, and capabilities as will hereafter appear and as are inherent in the construction disclosed herein. My invention further resides in the combination, construction and arrangement of parts illustrated in the accompanying drawing and, while I have shown therein what is now considered the preferred embodiment of this invention, I desire the same to be understood as illustrative only and not to be interpreted in a limiting sense.

Figure 1:
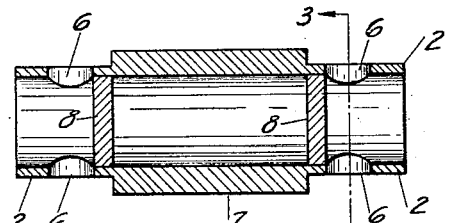
Figure 3:
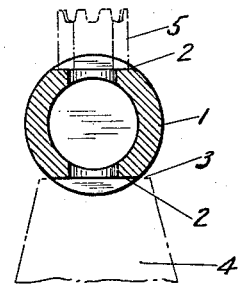
Figure 2:
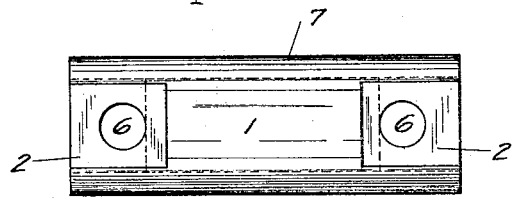
Figure 5:
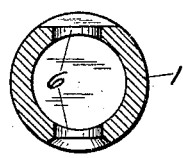
Figure 4:
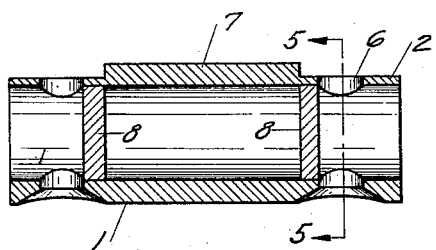
Figure 6:
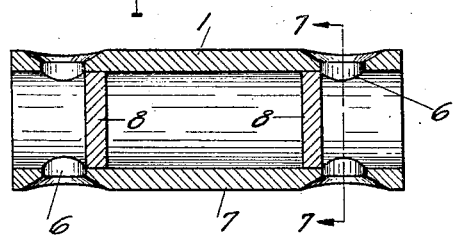
Figure 7:
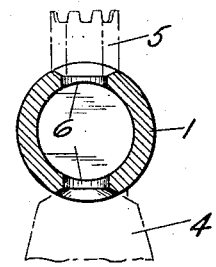

In the drawing annexed hereto and forming a part hereof, Fig. 1 shows a longitudinal section of a wrist pin embodying my present invention; Fig. 2 is a plan view of the construction shown in Fig. 1; Fig. 3 is a transverse section substantially along the plane indicated by the line 3—3, Fig. 1; Fig. 4 is a longitudinal section similar to that shown in Fig. 1 but illustrating a modified form of wrist pin; Fig. 5 is a transverse section taken substantially along the plane indicated by the line 5—5 Fig. 4; Fig. 6 is a longitudinal section similar to Figs. 1 and 4 of a still further modified form of this invention; and Fig. 7 is a transverse section taken substantially along the plane indicated by the line 7—7 Fig. 6.

As will be readily understood by those familiar with internal combustion engines, it is highly important to reduce to a minimum the weight of rapidly rotating or reciprocating parts, so long as this can be done without sacrificing the strength and safety. If wrist pins are made solid, a pin of a given strength will have a much smaller diameter than a pin of the same strength which is hollow. It is also desirable to have wrist pins of large diameter in order that the bearing surface thereof may be increased as much as possible, thus reducing the amount of wear during use and increasing the length of time elapsing between times when it is necessary to replace the wrist pins by new ones. In those constructions in which the wrist pins are perforated and mounted upon posts to which they are secured by nuts, the pressure of the nut, when screwed down to fasten the wrist pin in place, will distort the hollow pin, unless the same is supported in some way. I have found that this can be effectively done by cutting disks of the same diameter as the internal diameter of the tubular wrist pin. These disks are then pressed into the ends of the tube until they just pass the perforations. They are then left in this position and, when the nuts are screwed down into place, they can not cause distortion of that portion of the wrist pin which furnishes the bearing for the connecting rod.

My invention will now be described in greater detail in connection with the annexed drawing. As illustrated in this drawing, the wrist pin consists of a hollow cylindrical member 1 which is accurately machined to cooperate with machined faces of the holding nuts 5 and machined shoulders 3 on posts 4 formed in the interior of the engine pistons. Though the nuts 5 of Figs. 3 and 7 differ somewhat in form, this is merely because of variation in shape of the machined faces of the wrist pin. Perforations 6 are formed adjacent the ends of the wrist pins for reception of bolts extending upwardly from the posts 4.

The central portion 7 of the wrist pin is accurately machined to a cylindrical form so that it will fit properly in the cooperating opening of the connecting rod. Just inside of the openings 6 are located disks 8 which are of such a size that they fit tightly when pressed into the interior of the wrist pin. These therefore furnish internal support for the wall of the wrist pin to prevent the same from being distorted by pressure of the nut 5 when the same is screwed down on the bolt passing through the opening 6.

While I have shown flat faces 2, in Figs. 1, 2 and 3, and to a certain extent in Figs. 4 and 5, for cooperation with correspondingly shaped faces on the posts 4 and nut 5, it is believed that the countersunk shape shown in Figs. 4, 5, 6 and 7 is preferable because such will hold the wrist pin against sliding movement with relation to the posts, even though the bolts extending through the openings 6 do not exactly fit these openings. It will of course be understood that the specific description of structure set forth above may be departed from without departing from the spirit of my invention as set forth in this specification and the appended claims.

Having now described my invention, I claim:

1. A wrist-pin for an internal combustion motor, comprising a tubular body member having a portion externally cylindrical, provided adjacent its ends with perforations for the reception of securing means, and having imperforate closure members fitting tightly within the tubular member, and located closely adjacent said perforations, to serve as supporting means for the tubular member whereby to prevent distortion with as little increase in weight of the tubular body member as possible.

2. A wrist-pin comprising an outwardly cylindrical tubular member, provided adjacent its ends with transverse perforations whereby it may be secured to a piston, supporting disks forced tightly into the tubular member and occupying positions closely adjacent the transverse perforations whereby distortion of the tubular member will be prevented when the securing means is tightened up to hold the wrist pin in place.

3. A wrist-pin comprising a tubular cylindrical member having transverse perforations adjacent its ends, supporting disks within the tubular member and adjacent the transverse perforations to prevent distortion of the wrist pin when the same is under clamping compression, said wrist pin having non cylindrical machined surfaces surrounding and closely adjacent the perforations.

4. A hollow wrist-pin having a central cylindrical portion for operation in a cylindrical or substantially cylindrical opening, said wrist pin having transverse openings adjacent its two ends, and imperforate supports within the wrist pin closely adjacent to and extending parallel to the transverse openings and rigidly supporting opposite parts of the wrist pin adjacent the transverse openings through the ends of the pin.

In witness whereof, I hereunto subscribe my name to this specification.

RAY N. STEELE.